March 25, 1924.
C. W. SHARTLE
APPARATUS FOR MANUFACTURING PULP
Filed June 17, 1920
1,488,218
4 Sheets-Sheet 1
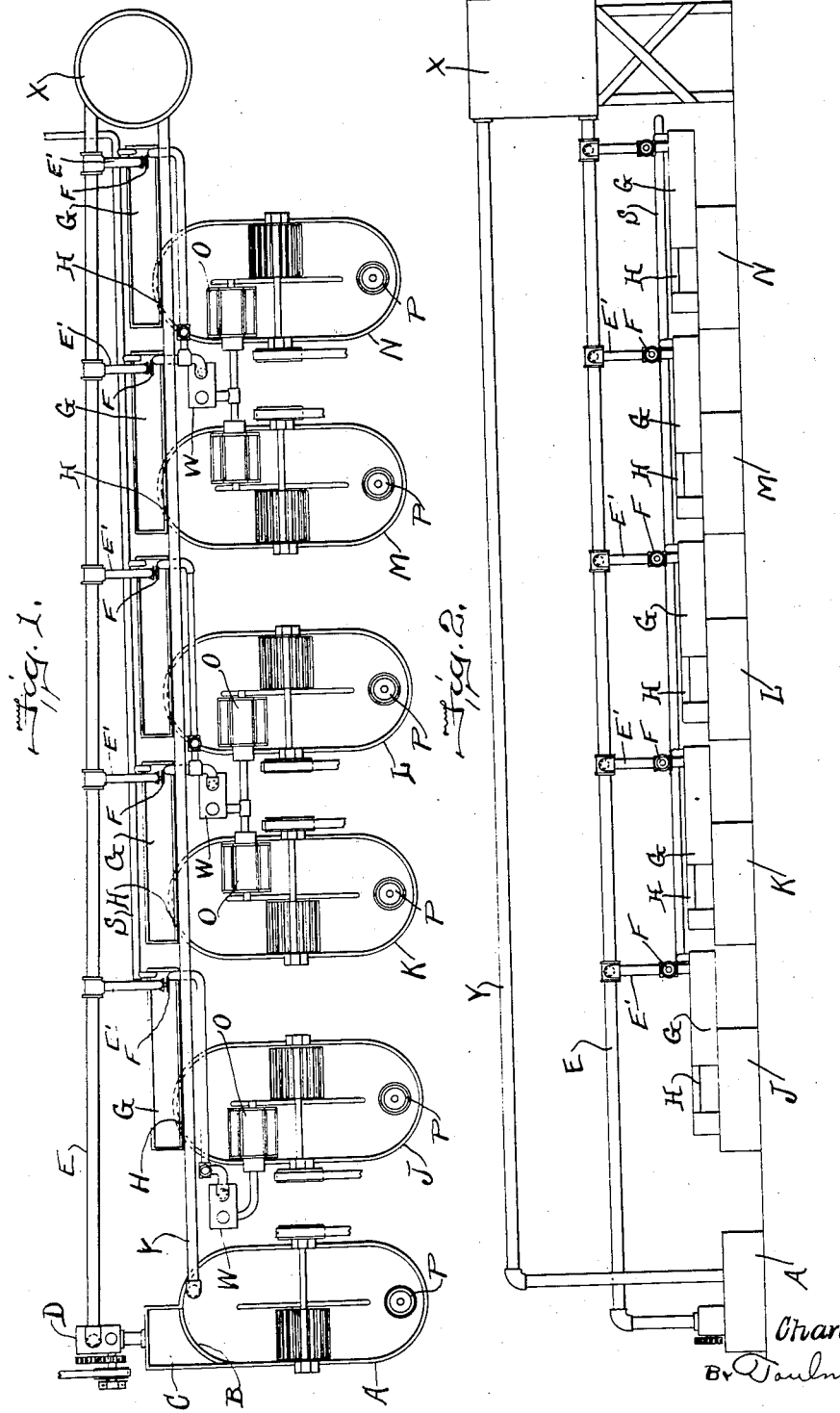
INVENTOR
Charles W. Shartle,
By Toulmin & Toulmin
ATTORNEYS

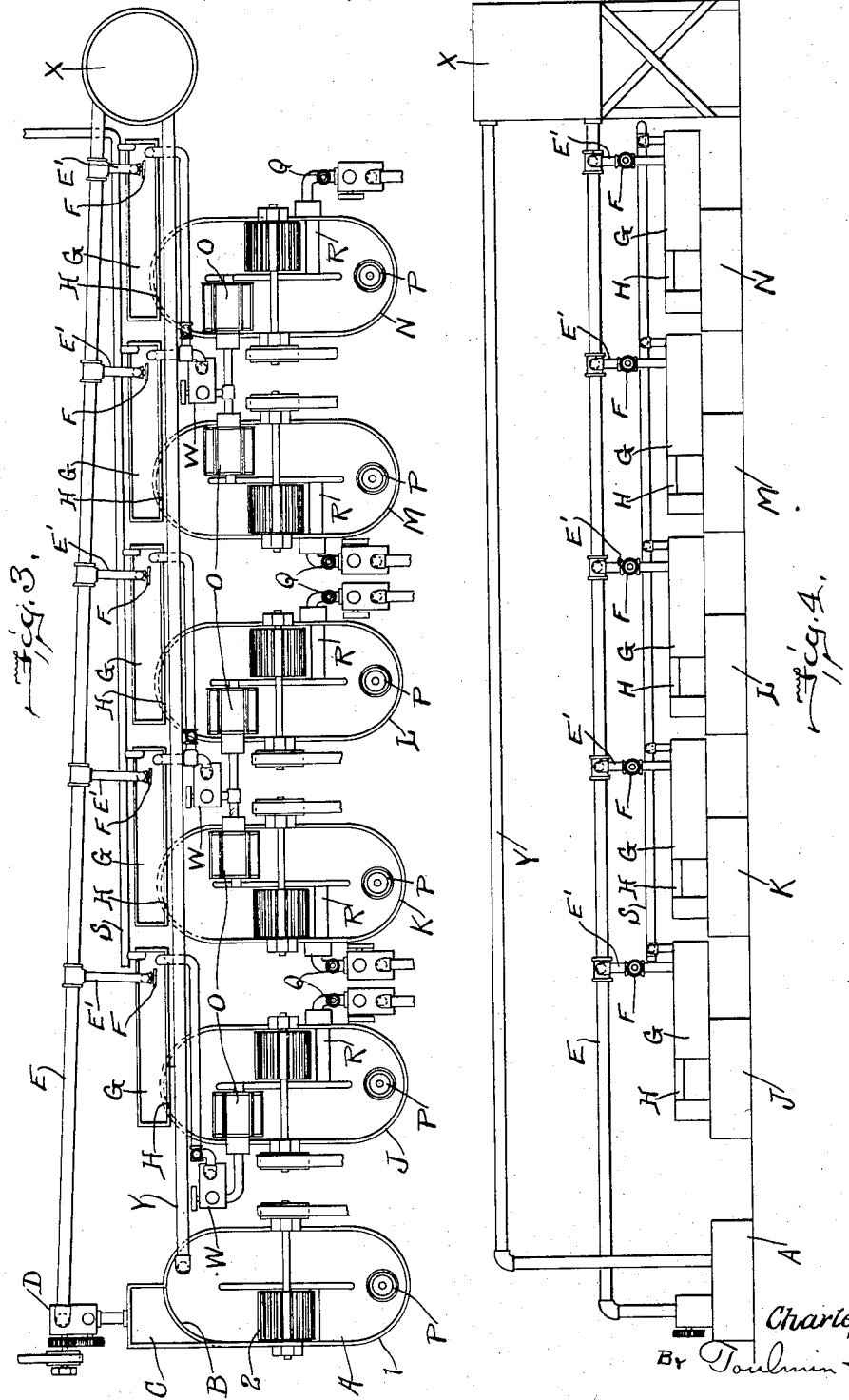

March 25, 1924.
C. W. SHARTLE
1,488,218
APPARATUS FOR MANUFACTURING PULP
Filed June 17, 1920 4 Sheets-Sheet 3
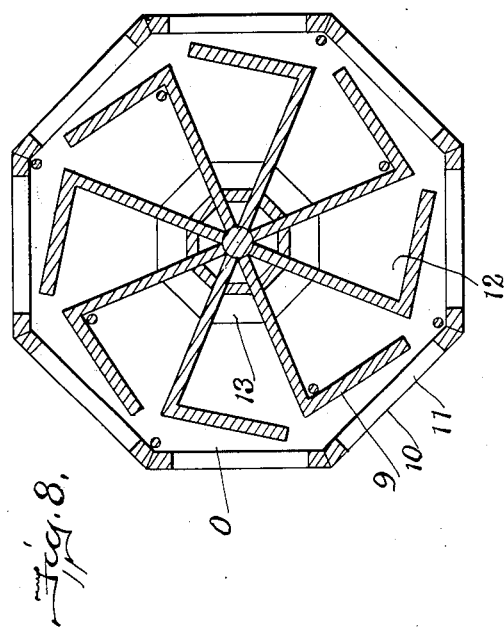
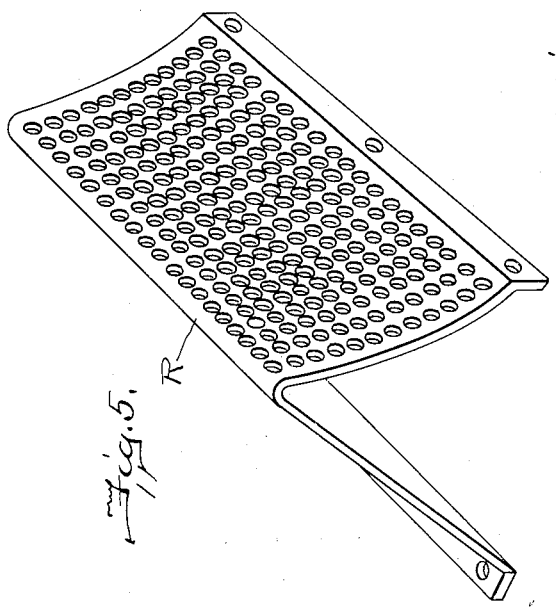
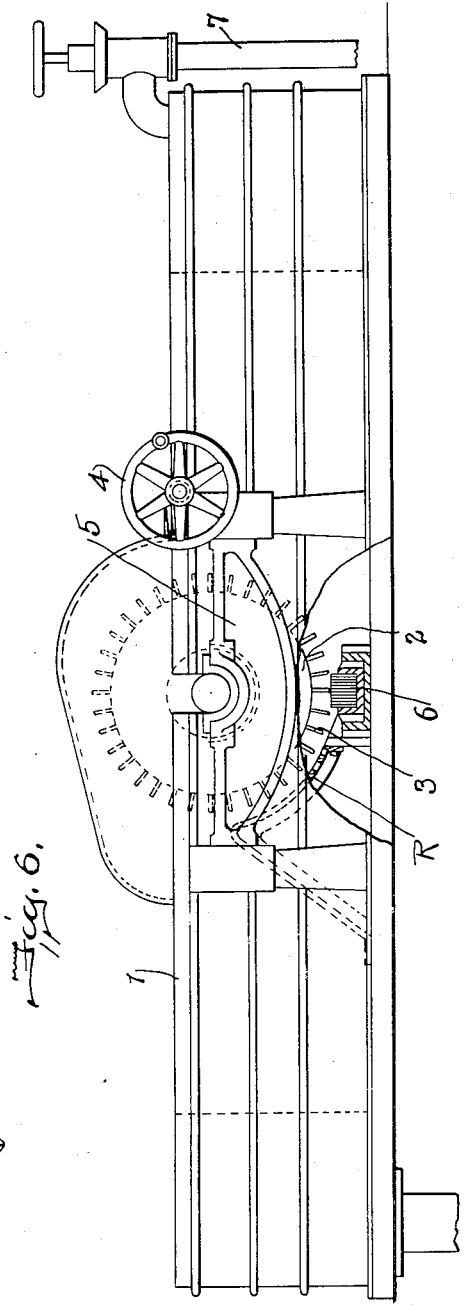
INVENTOR.
Charles W. Shartle,
BY Toulmin & Toulmin,
ATTORNEYS.

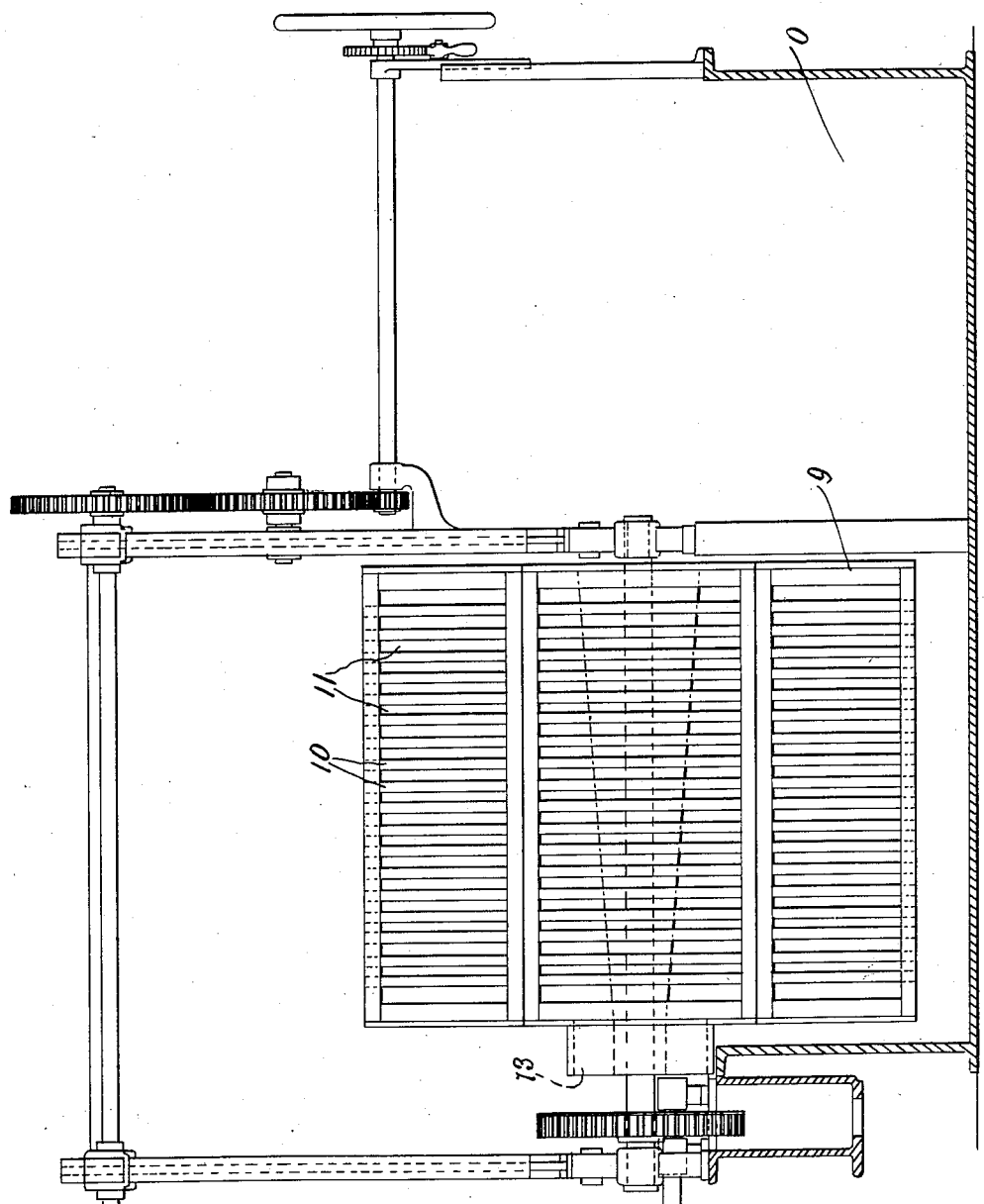

Patented Mar. 25, 1924.

1,488,218

UNITED STATES PATENT OFFICE.

CHARLES W. SHARTLE, OF MIDDLETOWN, OHIO.

APPARATUS FOR MANUFACTURING PULP.

Application filed June 17, 1920. Serial No. 389,584.

*To all whom it may concern:*

Be it known that I, CHARLES W. SHARTLE, a citizen of the United States, residing at Middletown, in the county of Butler and State of Ohio, have invented certain new and useful Improvements in Apparatus for Manufacturing Pulp, of which the following is a specification, reference being had therein to the accompanying drawings.

This invention relates to an improved apparatus for manufacturing pulp and has for its particular object to effect more even or uniform reduction of the pulp and also to facilitate the reducing operations as a whole, thus increasing the output of a plant of any given capacity.

The apparatus is herein shown and described in two modified forms of construction, both constructions being more or less conventional and here shown to illustrate the invention only. The invention relates to the arrangement and co-ordination of the operations of the different units of the apparatus as a whole without reference to minor details of construction of the different machines and devices comprised in the apparatus.

The construction herein illustrated and described is also adapted for the practice of an improved process for manufacturing pulp which constitutes the subject matter of a copending application for patent, Ser. No. 389,585, filed of even date herewith.

The invention furthermore deals with the common problem of separating foreign materials, such as metals, wood, glass, etc., and other irreducible or unsuitable substances for making pulp, provision being made in the invention to effectually eliminate all such foreign matter early in the operations of reducing the raw stock.

It is a further object of the invention to effect continuous operation of the different units of the apparatus, or at least that no material interruptions will intervene between successive steps of operation so that charging of the apparatus with raw stock and removal therefrom of finished pulp will be constant or continuous at least with reference to some of the units of the apparatus wherein duplicate operations are performed.

It is an object of the invention to provide an apparatus comprising a battery or a series of finishing beaters of any required number cooperating with a raw stock breaker whereby the full capacity of the breaker may be utilized for continuous operation, thus facilitating the operations of reducing the stock and to increase the output.

In the accompanying drawings,

Figs. 1 and 2 are a plan view and side elevation, respectively, more or less in diagrammatic or conventional form, illustrating the present invention in one preferred form of construction;

Figs. 3 and 4 agree with Figs. 1 and 2, respectively, except as to the use of back-falls in the finishing beaters;

Fig. 5 is a detail view of the perforated back-falls used in the construction shown in Figs. 3 and 4;

Fig. 6 is a side elevation showing a general form of breaker and beater construction such as may be used in the apparatus; and Figs. 7 and 8 are vertical and cross sectional views, respectively, showing the construction of stock washers used in connection with both forms of construction shown in the drawings.

The apparatus shown in Figs. 1, 2, 3 and 4 consists of a raw stock breaker A and a battery of finishing beaters J, K, L, M and N; and connections for circulating the stock and charging the finishing beaters from the raw stock breaker, consisting as here shown, of a weir B and overflow box C cooperating with the stock breaker to receive the overflow material therefrom; a stock pump D and stock circulation pipe E, chest X and return pipe Y whereby surplus stock from the chest is returned to the breaker; pipe connections E' and feed valves F for delivering stock from the pipe E to the settling troughs G; a water feed pipe S for supplying additional water to the stock in the troughs G; gates H for regulating the flow of stock from the settling troughs to the finishing beaters and the washers O for removing surplus water from the stock in the finishing beaters.

In addition to the above features which are common to both forms of construction shown in the drawings, the finishing beaters in the construction shown in Figs. 3 and 4 are each equipped with a perforated back-fall R whereby separation of fine or finished pulp from the coarse or unfinished material is effected.

The perforated back-falls, the detail construction of which is shown in Fig. 5, are of an improved type agreeing generally with the device shown in United States Patent No. 1,271,426, issued to Brownell Buehler, July 2nd, 1918. The back-falls serve to effect even grading of the pulp as the same arrives at finished state in the beater, and, therefore, to render the pulp more uniform.

The construction shown in Fig. 6 is a more or less conventional illustration of a stock braker or beater, such as commonly used in connection with pulp reducing apparatus. The machine consists of a large tank 1, having a breaker or beater roll 2 equipped with blades 3, mounted in suitable bearings therein. On a stock breaker, means for adjusting the breaker roll may be provided, such as the wheel and worm gear connection 4, whereby the bearing frame 5 may be raised and lowered, relative to the bed block or head 6. Water may be supplied to the tank from any suitable source, such as the pipe 7, and in a stock breaker any suitable means for conducting the overflow stock from the tank, such as a weir may be employed. It will be understood that the difference between a stock breaker and finishing beater consists in most part in the character of the blades with which the rolls 2 are equipped, the blades used in a breaker being usually heavy and dull, acting only to break up the stock, while those used in a beater are lighter and comparatively sharp and act to grind the stock.

The stock washer O as used in the present construction may be of any suitable type. As shown, this feature of the apparatus consists, see Figs. 7 and 8, of an octagonal drum or cylinder 9 mounted in suitable bearings in the beater wall, on the side opposite the beater rolls and adapted to be rotated therein by any suitable connections with the beater operating mechanism. The walls or faces of the drum 9 are preferably provided with alternate slats 10 and spaces 11 which permit water in the beater to pass freely to the interior of the drum, the water being then discharged from the drum by means of the buckets or troughs 12 which act to lift the water and discharge the same from the drum 9 through the openings 13 provided in one side thereof.

In the operation of the apparatus the raw material which preferably has been reduced by a previous operation to fine cut stock, is continuously, or as required, charged into the breaker A by any suitable means, sufficient water being added to the material in the tank to readily effect the breaking up of the stock therein by the action of the breaker blades. From the breaker the stock overflows the weir B into overflow box C and is thence delivered through stock circulating pipe E to chest X by the pump D. The pipe E is provided at suitable intervals with feed pipes E' having controlling valves F whereby each of the finishing beaters J, K, L, M and N may be supplied with stock from the pipe E, the stock for each beater first flowing through a settling trough G wherein water is added thereto through any suitable source, as by the pipe S, to more readily effect separation from the mass of material of heavy foreign substances which will gravitate to the bottom of the trough and may be removed therefrom by any suitable means.

The surplus stock from the pipe E is charged, as here shown, into a chest X, the connection of the pipe to the chest being preferably near the bottom of the chest, the pipe Y being connected to the chest near the top thereof to conduct any overflow of stock therefrom back to the breaker A, thus forming a continuous connection between the different units of the apparatus for the movement of the stock and providing also for continuity of operation of the apparatus as a whole.

In the finishing beaters the stock is ground to the required state by continuous operation and when final reduction thereof has been arrived at, the stock may be discharged from the beaters through dump valves P, as illustrated in Fig. 1, or through perforated back-falls, as contemplated in the form of construction shown in Fig. 3. From the beaters the finished material may be delivered to a suitable receptacle, such as a stuff-chest, for finished pulp.

The perforated back-falls may have apertures therein of any desired size as may be determined by the grade of pulp to be manufactured therein.

The back-falls may be permanently open to permit of continuous grading or separating of the fine material from the coarse, in which event the valves F and gates H may also remain permanently open, but adjusted to regulate the supply of stock to the beaters; or the back-falls may be adjusted by a suitable valve, as indicated at Q, whereby the same may be intermittently opened and closed to effect treatment of the stock in the beaters in batches, in which event the charging of the beaters with stock from the pipe E will also be intermittent, a charge of stock following in each case a discharged of finished pulp from the beaters.

The stock washers O will act, as herein described, to extract excess water from the stock in the finishing beaters. Suitable connections, as pumps W, are preferably provided whereby the water from the washers will be returned to the settling troughs G. Thus any fine stock carried off with the water from the beaters will be returned again to the stock in the settling trough and waste of material will be prevented.

From the foregoing detailed description the construction, arrangement and operation of the improved apparatus will be readily understood by those experienced in this art. It will be observed that the individual units of the apparatus consist in most part of machines and devices of well known construction, but that the coordinated relation of these units in the device as a whole is of a radically new construction and that operation and results of operation of a new and decisive character are thereby effected.

Having thus fully described my invention, what I claim as new and desire to secure by Letters Patent, is:—

1. In an apparatus for reducing pulp, the combination, with a raw stock breaker and a plurality of finishing beaters, of connections between said breaker and beaters consisting stock-circulating pipe having intake and discharge connections with said breaker and settling troughs, whereby stock from the breaker will be circulated through said pipe and subjected to a settling operation in said troughs before being delivered to said finishing beaters.

2. In an apparatus for reducing pulp, the combination, with a raw stock breaker and a plurality of finishing beaters arranged in series and adapted for simultaneous operation coincident with the operation of said breaker, of connections between said breaker and beaters consisting of a stock-circulating pipe and a settling trough for each beater, whereby stock from the breaker will be subjected to a settling operation before being delivered to each of said finishing beaters.

3. In an apparatus for reducing pulp, the combination, with a raw stock breaker and a plurality of finishing beaters adapted for simultaneous operation coincident with the operation of said stock breaker, of connections between said breaker and beaters consisting of a stock-circulating pipe and a settling trough for each beater, whereby stock from the breaker will be subjected to a settling operation before being delivered to each of said finishing beaters.

4. In an apparatus for reducing pulp, the combination, with a raw stock breaker and a plurality of finishing beaters, of connections between said breaker and the beaters consisting of a stock circulating pipe, a stock chest and a plurality of settling troughs, one for each beater, whereby stock from the breaker will be delivered through said troughs into said beaters, and a connection with said chest whereby surplus stock will be returned to the breaker.

5. In an apparatus for reducing pulp, the combination, with a raw stock breaker and a plurality of finishing beaters each having means for the discharge of stock, of connections between said breaker and beaters consisting of a stock circulating pipe and a plurality of settling troughs, one for each beater, whereby stock from the breaker is delivered to said settling troughs, means to add water to the stock in the settling troughs, and means to discharge the stock from the settling troughs into the finishing beaters.

6. In an apparatus for reducing pulp, the combination, with a raw stock breaker and a plurality of finishing beaters each having means for the discharge of stock, of connections between said breaker and beaters consisting of a stock circulating pipe and a plurality of settling troughs, one for each beater, whereby each trough may be separately charged with stock from said pipe, means to add water to the stock in the settling troughs, and means to discharge the stock from the settling troughs into the finishing beaters.

7. In apparatus for reducing pulp, the combination, with a raw stock breaker and a plurality of finishing beaters each having means for the discharge of stock, of connections between said breaker and beaters consisting of a stock circulating pipe and a plurality of settling troughs, one for each beater, whereby each trough may be separately and continuously charged with stock from said pipe, means to add water to the stock in the settling troughs, and means to discharge the stock from the settling troughs into the finishing beaters.

8. In an apparatus for reducing pulp, the combination, with a raw stock breaker and a plurality of finishing beaters, of connections between the breaker and finishing beaters including settling troughs whereby the beaters may be charged with stock from the breaker, means in the finishing beaters for extracting excess water from the stock therein, and means to return the water extracted to the settling trough.

9. In an apparatus for reducing pulp, the combination, with a raw stock breaker and a plurality of finishing beaters, of connections between the breaker and finishing beaters including settling troughs whereby the beaters may be charged with stock from the breaker, a rotatable washer operable in each of the finishing beaters to extract excess water from the stock therein, and means to return the water extracted to the settling trough.

In testimony whereof, I affix my signature.

CHARLES W. SHARTLE.